United States Patent
Davie

[11] 3,975,668
[45] Aug. 17, 1976

[54] DYNAMIC BRAKING FOR A THREE PHASE MOTOR

[75] Inventor: Walter C. Davie, Los Angeles, Calif.

[73] Assignee: Xerox Corporation, Stamford, Conn.

[22] Filed: Sept. 25, 1972

[21] Appl. No.: 291,853

[52] U.S. Cl. .............................................. 318/212
[51] Int. Cl.² .......................................... H02P 3/20
[58] Field of Search ........... 318/211, 212, 225, 226; 310/12; 322/28

[56] References Cited
UNITED STATES PATENTS

| 1,997,464 | 4/1935 | Krebs | 318/212 |
| 3,643,242 | 2/1972 | Bryer | 310/12 X |
| 3,721,888 | 3/1973 | Allport | 322/28 X |

FOREIGN PATENTS OR APPLICATIONS

| 643,271 | 4/1937 | Germany | 318/212 |

Primary Examiner—Gene Z. Rubinson
Attorney, Agent, or Firm—James J. Ralabate; Michael J. Colitz; Franklyn C. Weiss

[57] ABSTRACT

Method and apparatus for dynamically braking a multiphase motor wherein, in a first embodiment, the stator windings of the motor are connected in a six winding delta configuration and direct braking current is applied between two center taps of the configuration. A damping diode is connected across two of the delta center taps to minimize voltage transients in the windings when the direct current is removed.

In a second embodiment, the stator windings are connected in a twisted Y—Y configuration, the connections to the neutral points of the two Y's of one phase winding set being interchanged and direct braking current being introduced between the two neutral points. A damping diode is connected between the center points of each Y to minimize voltage transients in the windings when the direct current is removed.

4 Claims, 7 Drawing Figures

DYNAMIC BRAKING FOR A THREE PHASE MOTOR

BACKGROUND OF THE INVENTION

Prior art techniques for dynamically breaking polyphase motors, such as the three-phase induction motor, customarily introduced direct current into the motor windings by means of relay contacts in order to switch the windings from an alternating current source to a source of direct current. Several disadvantages are incurred when this technique is utilized. Since both alternating and direct currents enter the motor at the same terminals, the switching of these connections is required. In addition, inadvertent simultaneous application of vboth alternating and direct current paths, even momentarily, may result in a short circuit condition. Therefore, considerable care must be taken in switch timing such that simultaneous closure of both current paths does not occur. Finally, since a damping diode normally is not connected to the motor while it is running, care must be taken to reduce the direct current to zero before breaking the direct current path, thereby avoiding a destructive arc which may occur due to the inductance of the motor windings discharging across prematurely opened contacts.

Examples of prior art references which disclose techniques for dynamically braking a multiphase motor include U.S. Pat. No. 2,493,670 to Harvey et al which discloses a braking circuit arrangement with alternating current applied to the motor windings. Subsequent to switching the alternating current off, direct current is applied to the same windings to achieve dynamic braking.

U.S. Pat. No. 2,514,342 to Schoenbaum discloses a technique whereby rectified alternating current is applied to the motor windings in phased opposition to the current impressed thereon by the ordinary power supply circuits. The rectifier circuits, therefore, reverse the phase of the current applied to the motor and the rectifier circuits are connected in phase opposition with the corresponding power supply circuits. The rectified and alternating currents are applied to the same windings.

U.S. Pat. No. 2,858,494 to Choudhury discloses a technique for applying braking direct current while the motor windings are still being energized by the alternating current supply. In this patent, both alternating and direct currents are applied simultaneously to the same winding.

U.S. Pat. No. 3,281,632 to Ozaki discloses a technique for dynamically braking a three-phase induction motor without utilizing a separate source of direct current.

SUMMARY OF THE PRESENT INVENTION

The present invention provides novel apparatus for dynamically braking a three-phase motor which is less complex, less expensive, and more re;liable than the prior art techniques set forth hereinabove.

Disk pack memory systems, which are extensively utilized with computer systems, require that the disk driving motor be capable of being dynamically braked as rapidly as possible in the case of power failure. The disks are rotated by the motor at a constant speed as the associated magnetic transducer heads are positioned to selected data tracks formed on the disk surface. In the case of power failure, a condition known as "head crash" may occur whereby the magnetic heads, normally in flying position above the disk surface, are caused to contact the disk surface. The heads, in contact with the disk surface while the disks are decreasing in speed due to inertia, can erase the data recorded on the disk surfaces and scratch the magnetic surface. Therefore, it is essential that the disk pack driving motor be capable of being rapidly braked.

The apparatus of the present invention is not harmed by the simultaneous application of both alternating and direct current to the motor windings since at least one motor winding impedance between the alternating and direct current input terminals is maintained. Separate alternating and direct current input terminals eliminate the necessity of terminal switching. Since simultaneous application of alternating and direct currents is not destructive, elaborate timing interlocks are not needed. In addition, a damping diode is connected across the direct current input terminals to suppress inductive voltage surges when the direct current is removed after the dynamic braking is completed. In particular, two embodiments are provided which involve rearranging the motor stator wiring. The conventional three-phase, six winding dual voltage motor is, in the first embodiment, connected as a center tapped, six winding delta configuration with direct current introduced between two of the delta center taps. A net direct current magnetic field is generated in the motor windings by introduction of direct current when the alternating motor current is removed, thereby achieving dynamic braking. In order to avoid high voltage transients due to current decay in the winding inductances when direct current is removed, a damping diode is connected across two of the delta center taps. In a second embodiment, the stator windings are connected in the "twisted Y—Y" configuration, the connections to the neutral points of one phase winding set being interchanged and direct braking current being introduced between the two neutral points.

It is an object of the present invention to provide apparatus for rapidly braking a polyphase motor.

It is a further object of the present invention to provide apparatus for rapidly braking a three-phase motor.

It is still another object of the present invention to provide apparatus for rapidly braking a three-phase motor wherein, in one embodiment, the stator windings of the motor are connected in a six winding delta configuration and wherein direct braking current is applied between two center taps of the delta configuration. A damping diode, in a further refinement of the first embodiment, is connected across two of the delta center taps to minimize voltage transients in the windings when the direct current is removed. In a second embodiment the stator windings are connected in a "twisted Y—Y" configuration, the connections to the neutral points of the two neutral taps of one phase winding set being interchanged and direct braking current being introduced between the two neutral points. A damping diode, in a further refinement of the second embodiment, is connected across the two neutral taps to minimize voltage transients in the windings when direct current is removed.

It is a further object of the present invention to provide apparatus for dynamically braking a polyphase motor which is utilized in an electro-mechanical random access memory in which magnetic transducer heads are movable and the magnetic recording media is removable, the motor rotating the magnetic recording media.

DESCRIPTION OF THE DRAWINGS

For a better understanding of the invention, as well as other objects and features thereof, reference is made to the following description which is to be read in conjunction with the accompanying drawing wherein:

FIG. 4 showing full wave braking from line and FIG. 5 showing half wave braking from line;

DESCRIPTION OF THE PREFERRED EMBODIMENTS

Figure 1:
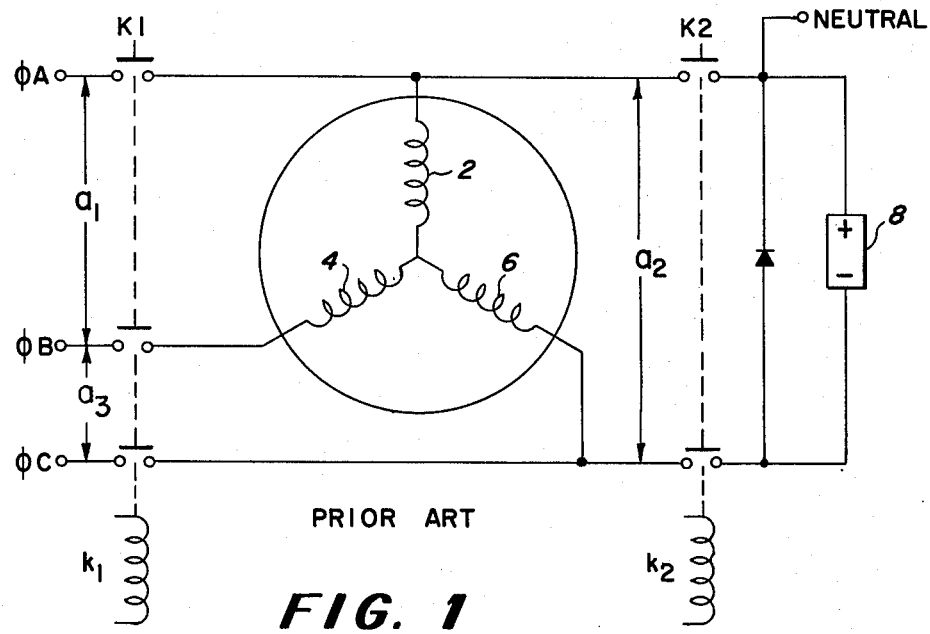
FIG. 1 shows a typical prior art system for introducing braking current into the windings of three-phase motor.

Referring now to FIG. 1, a typical prior art system for introducing direct current into a three-phase motor for purposes of braking utilizing relay contacts for switching the windings from their alternating current inputs to a source of direct current is illustrated.

In operation, solenoid $k_1$ is energized thereby applying three-phase current ($\phi_A$, $\phi_B$, $\phi_C$) to the stator windings 2, 4, and 6 of a three-phase motor via the contacts of relay switch $K_1$. Voltage $a_1$ (approximately 208 volts in the example described herein) is applied across windings 2 and 4 as shown, voltage $A_2$ (of a value substantially equal to the voltage $a_1$) being applied across windings 2 and 6 and voltage $a_3$ being applied across windings 4 and 6.

Disadvantages associated with the circuit of FIG. 1 are apparent when solenoid $k_2$ is energized thereby applying braking current to the windings from direct current source 8 via the contacts of relay switch $k_2$. For example, if relay $k_1$ is slower than relay $k_2$, a short circuit condition may occur when the $k_1$ solenoid is de-energized and the $k_2$ solenoid is energized, i.e., a short circuit path is produced momentarily through the $\phi_A$ terminal, the upper contact of relay $k_2$ and the neutral line, the short circuit condition damaging the switch. In addition, the high voltage $a_2$ appearing across windings 2 and 6 limit the type of switching devices which may be utilized to apply direct braking current to the windings, i.e., a relay switch can be utilized, but solid state switches generally operate as low voltage devices, and therefore, would be inoperable and/or damaged under conditions wherein alternating current and direct current are simultaneously applied to the motor windings.

The aforementioned disadvantages of the prior art braking systems are overcome by the apparatus of the present invention as set forth hereinbelow.

Figure 2:
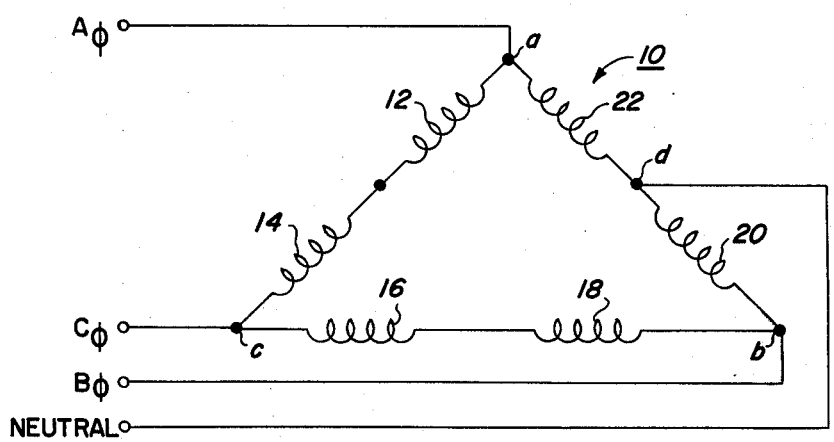
FIG. 2 shows a schematic diagram of the delta connection configuration for a three-phase induction motor as utilized in the present invention.

Referring now to FIG. 2, there is shown a schematic diagram of the delta winding connections of a three-phase induction motor in accordance with the teachings of the present invention. Although an induction motor is illustrated, a three-phase synchronous, or other three-phase motor having similar stator windings, may be utilized. The standard three winding deta connection is rearranged in six winding connection 10. The three-phase line source $A\phi$, $B\phi$, and $C\phi$ are connected to the delta terminal points $a$, $b$, and $c$, respectively, as shown. The neutral wire of a three-phase, four wire source is connected to center tap point $d$. The six windings are represented as inductances 12, 14, 16, 18, 20 and 22.

Figure 3:
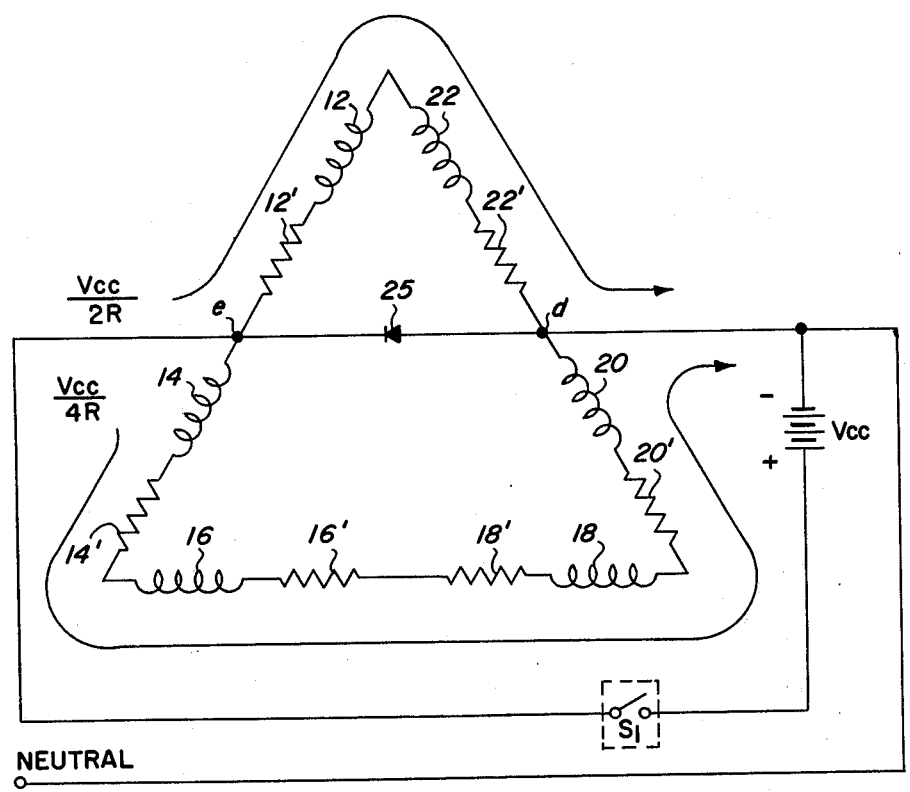
FIG. 3 shows a schematic diagram of the delta connection configuration of FIG. 2 with direct braking current and a damping diode applied thereto.

FIG. 3 illustrates the schematic shown in FIG. 2 with direct braking current applied to the stator windings. With direct (d.c.) current applied, the winding resistances 12', 14' . . . 22' are elements of the schematic (the same elements are represented by identical reference numerals in the several figures). A damping diode 25 is connected across center tap points d and e illustrated. A source of potential Vcc is connected via switch $S_1$ to center tap points $d$ and $e$. The line neutral may be connected to center tap $d$, as shown, or center tap $e$. Damping diode 25 minimizes high voltage transients due to current decay in the winding inductances when voltage Vcc is removed; i.e., after the motor has been braked. In the embodiment shown in FIG. 3, the damping diode 25 is maintained permanently across the two delta center taps $d$ and $e$.

In operation, three-phase current is applied to the stator windings of an alternating current induction motor. If it is desired to rapidly brake the motor, the three-phase current is removed (either intentionally or due to power failure) and switch $S_1$ (FIG. 3) is closed, d.c. current thereby being applied to the windings as shown. Switch $S_1$ (and the braking current switches $S_2$, $S_3$, and $S_4$ shown in FIGS. 4, 5, and 6, respectively) may be actuated (i.e. braking current applied to the motor windings) automatically in response to various external conditions, i.e., decrease in motor speed (described in reference to FIG. 7 hereinafter), power failure, motor overheating, etc. Alternately, switch $S_1$ may be actuated manually when desired. If it is assumed that all inductance resistances are equal, the magnitude of the current flowing through the windings 12 and 22 would be equal to Vcc/2R, R being the d.c. resistance of each winding, while the current flowing through windings 14, 16, 18, and 20 is equal to Vcc/4R. After the motor has been braked, switch $S_1$ is opened to remove the braking current. As set forth hereinabove, the damping diode 25 acts to minimize the voltage transients induced in the inductance windings when there is an instantaneous exchange of current through the windings.

Figure 4:
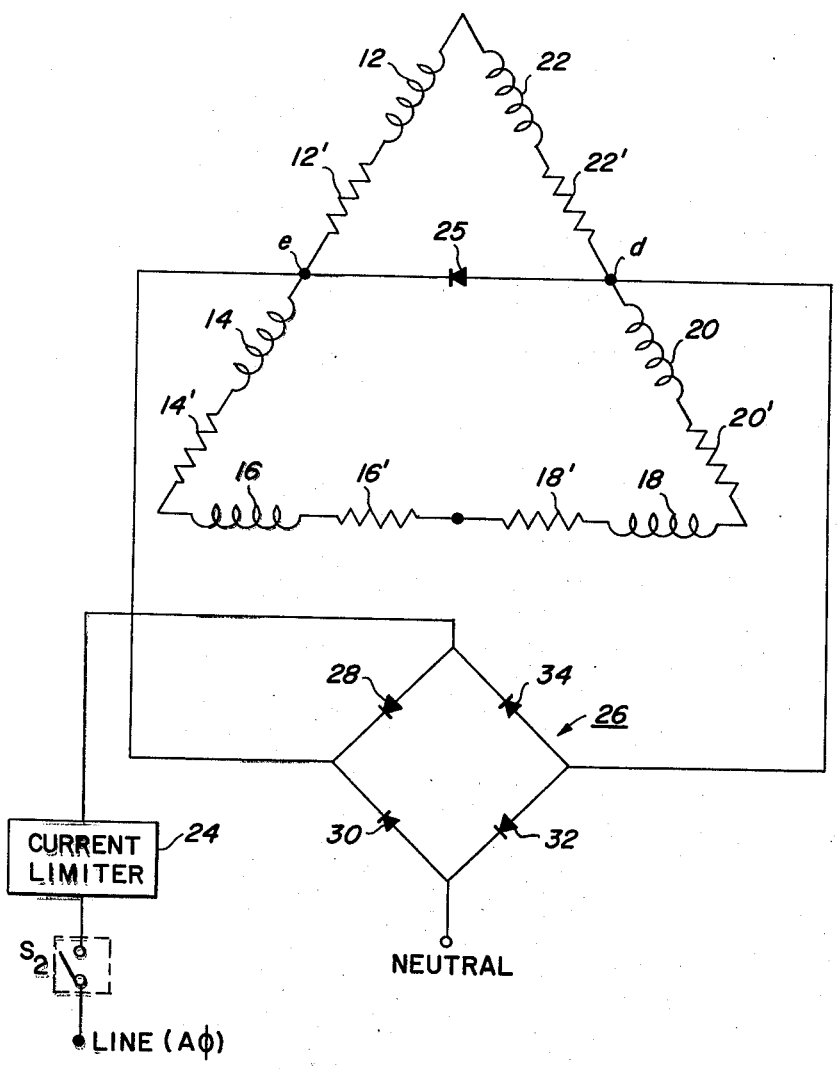
FIGS. 4 and 5 show schematic diagrams of the delta connection configuraton of FIG. 2 illustrating the use of rectified line current for the direct current instead of a separate direct current supply.
Figure 5:
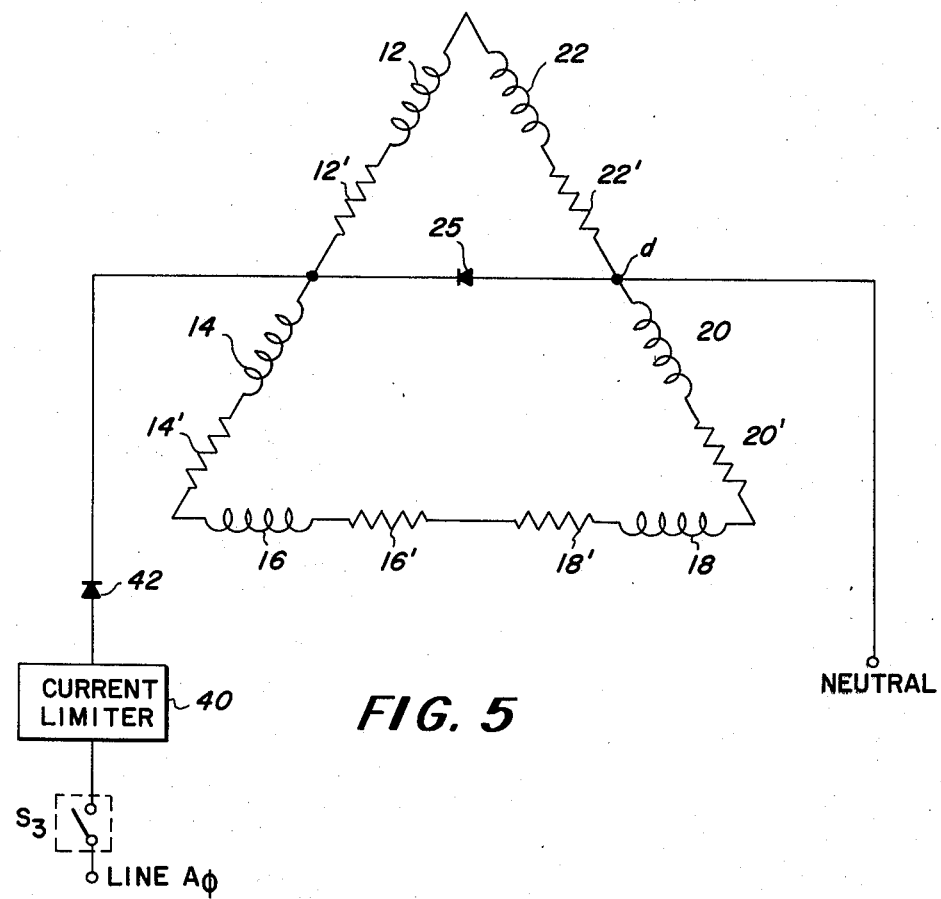

FIGS. 4 and 5 illustrate the situation when a separate d.c. source is not utilized, but the line current is used to feed the delta windings. In FIG. 4, single phase current is directed to full wave rectifier 26 composed of diodes 28, 30, 32, and 34 via current limiter 24 and switch $S_2$. Line neutral may be connected to terminal $f$ as shown. In FIG. 5, half wave rectification is utilized to generate direct current. When switch $S_3$ is closed, single phase current passes through current limiter 40 and rectifier diode 42 to the windings.

The stator connections shown in FIGS. 2–5 establish a separate motor terminal for d.c. braking with no necessity of changing connection taps to provide for d.c. current introduction. In one arrangement, one of the delta center taps may be permanently connected to line neutral. Permanently connecting damping diode 25 across two of the three delta center taps while alternating (a.c.) current is applied to the motor allows the diode to remain in the circuit for the purpose of suppressing inductive voltage surges when d.c. current is removed after dynamic braking is completed. By applying alternating and direct currents to different motor terminals, elaborate switching schemes are not required. Inadvertent simultaneous application of both current paths, even momentarily, which would result in a disastrous short circuit condition in conventional braking circuits as explained with reference to FIG. 1 hereinabove, is avoided without the necessity of complex timing circuits. Since damping diode 25 remains connected to the motor while it is in operation, elaborate precautions need not be taken to reduce the d.c. current to zero after braking, which otherwise would cause a destructive arc due to the inductive of the motor windings discharging across prematurely opened contacts. In addition, the simultaneous application of both a.c. and d.c. current is not harmful since at least one motor winding impedance exists between the a.c. and d.c. input terminals. Although the simultaneous application of a.c. and d.c. currents to the motor terminals does not normally occur when dynamically braking the three-phase motor, if it is desired to use the motor in applications which require fine speed for shaft phasing control, the d.c. current being the control parameter, a.c. current in these applications would be applied simultaneously.

The center taps of the delta connection remain near neutral and therefore one or all of them may be tied to the neutral wire of a three-phase, four wire source.

When d.c. current is introduced between two of the delta center taps, a net d.c. magnetic field is produced in the motor windings and dynamic braking is achieved when the alternating current is removed.

Figure 6:
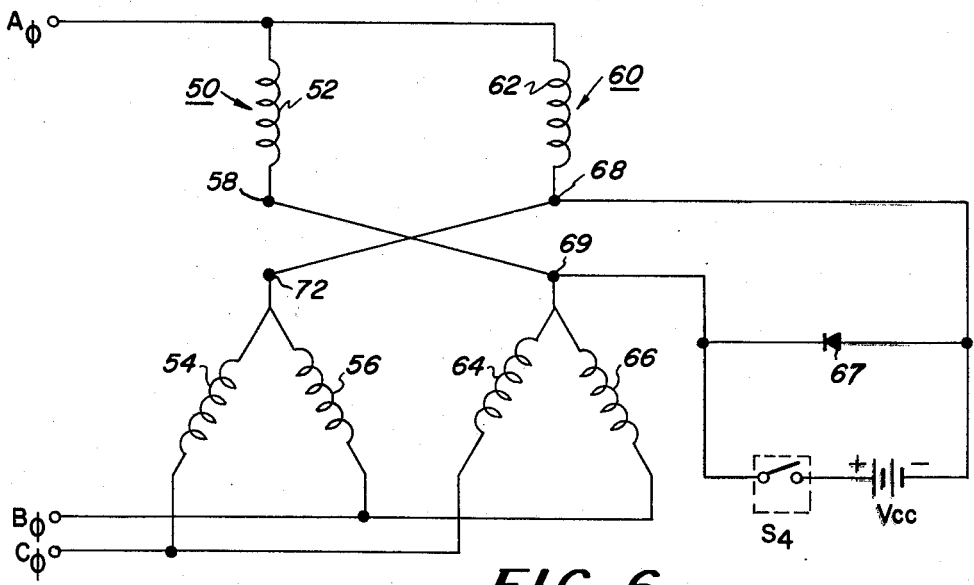
FIG. 6 shows a schematic diagram of the "twisted Y—Y" connection for a three-phase induction motor with direct braking current and a damping diode applied thereto.

Referring now to FIG. 6, a "twisted Y—Y" connection for the stator windings of a three-phase dual voltage induction motor operating on the low voltage connection is shown. The first Y connection comprises windings 52, 54, 56, and neutral point 58. The second Y connection comprises winding 62, 64, and 66 and neutral point 68. The three-phase line current is connected to the windings as shown. The connections to the neutral points of the two phase legs 50 and 60 of one phase winding set are interchanged; i.e., neutral point 58 is connected to neutral point 69 and neutral point 68 is connected to neutral point 72. A source of d.c. braking current Vcc is connected between the two neutral points 58 and 68 when switch $S_4$ closed. The circuit has a relative d.c. input resistance of 2R/3 if each winding is considered as having a unit resistance. The center tap delta connection described hereinabove in reference to FIGS. 2–5 in comparison has a relative resistance of 4R/3. This makes the twisted Y—Y connection preferred when a low voltage d.c. source, such as a battery is utilized. The damping diode 67, connected across the two neutral center taps 58 and 68, remains in the circuit for purposes of suppressing inductive voltage surges when d.c. current is removed after dynamic braking is completed.

The "twisted Y—Y" allows the d.c. current to be referenced between two points which remain at neutral potential during normal motor operation, thus avoiding complicated switching arrangements and making possible d.c. switching from a device with limited off-state voltage capability. Therefore, the use of solid state switching devices, i.e. transistors, silicon controlled rectifiers (SCR's) etc. for control of braking direct current is easily implemented. The aforementioned solid state switching devices generally have a voltage off-state capability of one-tenth or less of the a.c. voltage which would be applied across the device if the prior art arrangement of FIG. 1 was utilized. This also applies to the center tap delta configuration described hereinabove.

Figure 7:
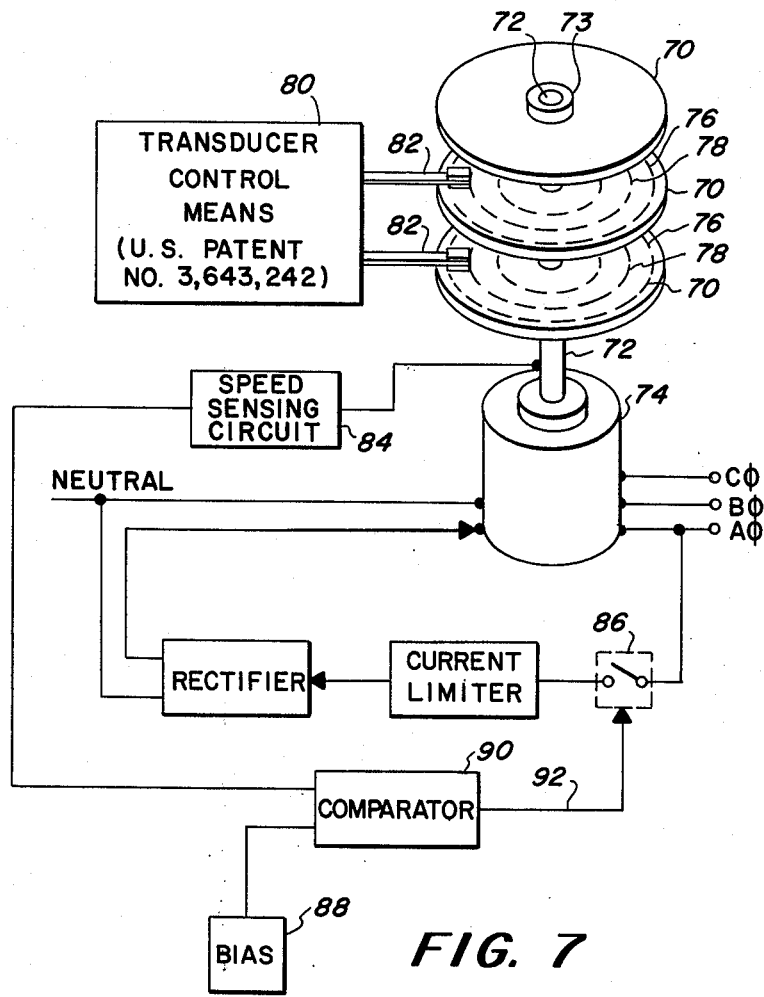
FIG. 7 illustrates the application of the invention described in FIG. 2-6 to drive a disk pack.

Referring now to FIG. 7, a disk pack system in which the dynamic braking technique described hereinabove may be utilized is illustrated. The disk pack system is shown in highly schematical form for illustrative purposes. A plurality of disk units 70 are disposed in a space stacked arrangement for rotation in planes parallel to one another on a shaft 72 which is rotatively coupled to the electrical motor 74 described hereinabove with references to FIGS. 2–6. A hub nut, or cap 73, fixed in any well known fashion to the shaft 72, secures all of the disks thereto as a unitary assembly. Each of the record disks 70 are coated with a magnetic material on opposite parallel surfaces thereof; i.e., top and bottom surfaces. A plurality of tracks 76 are arranged on each surface of the disk where data is recorded. A transducer control means 80, such as that shown in U.S. Pat. No. 3,643,242, controls the positioning of a plurality of transducers 82 relative to the stack of disks 70. Transducer control means 80 controls the position of the transducers for a particular section of the track on one of the disks, one of the transducers interacting with a selected track. It should be noted that the transducers also can be driven in tandem whereby the transducers are positioned to corresponding tracks on different disk surfaces. A linear motor, included within the transducer control means, displaces and positions the transducers 82 in a horizontal direction and radially to the vertically oriented axis upon which the disks are mounted for rotation. The motor 74 is connected as described in the FIGS. 2–6 with three-phase line current and a neutral line as shown. In this embodiment, the line current provides the d.c. braking current.

In operation, motor 74 is energized by the line current to rotate the disk pack at a constant speed, 4000 rpm being a representative speed. If it is desired to brake motor 74, i.e., in the case of power failure, switch 86 is closed and the motor is dynamically braked by the d.c. current as described hereinabove. If it is desired to brake motor 74 when the speed thereof falls below a predetermined value, a speed sensing circuit 84 (i.e., a tachometer) is utilized to monitor the speed of shaft 72. When the electrical output of speed sensing circuit reaches a desired speed of 1200 rpm for example, represented by the electrical output of bias means 88, comparator means 90 generates a control signal on line 92 to automatically close switch 86 thereby applying the d.c. braking current to motor 74.

Braking times on the order from about one to about ten seconds are provided by the apparatus of the present invention.

While the invention has been described with reference to its preferred embodiments, it should be understood by those skilled in the art that various changes in form and detail may be made without departing from the true spirit and scope of the invention. All such changes are considered to be within the scope of the present invention as defined by the claims appended thereto.

what is claimed is:

1. Apparatus for dynamically braking a motor operable from a source of three-phase current comprising:
a motor stator section whose windings are connected in a delta configuration, each side of the delta comprising at least two windings connected at a center tap, said three-phase current being applied to the delta terminal points,
a source of d.c. current, and
switch means for connecting said source of d.c. current between two of said center taps of said delta configuration when the three-phase current source is removed from the delta terminal points whereby said motor is dynamically braked.

2. The apparatus as defined in claim 1 further including means connected between said two center taps for minimizing voltage transients in the windings when said source of d.c. current is removed from said delta center taps.

3. The apparatus as defined in claim 2 wherein said minimizing means comprises a diode.

4. The apparatus as defined in claim 1 wherein said motor drives a shaft upon which a plurality of magnetic disk units are disposed in a space stacked arrangement for rotation in planes parallel to one another, said disks being secured on said shaft as a unitary assembly.

* * * * *